(12) United States Patent
Sasson et al.

(10) Patent No.: US 10,747,452 B1
(45) Date of Patent: Aug. 18, 2020

(54) HYBRID LOG-STRUCTURED ARRAY AND ALLOCATED STORAGE DEVICE

(71) Applicant: International Business Machines Corporation, Armonk, NY (US)

(72) Inventors: Ben Sasson, North Baddesley (GB); Christopher B. E. Beeken, Eastleigh (GB); Joanna K. Brown, Winchester (GB); Florent Rostagni, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/281,671

(22) Filed: Feb. 21, 2019

(51) Int. Cl.
*G06F 12/10* (2016.01)
*G06F 3/06* (2006.01)

(52) U.S. Cl.
CPC ............ *G06F 3/0631* (2013.01); *G06F 3/064* (2013.01); *G06F 3/0611* (2013.01); *G06F 3/0659* (2013.01); *G06F 3/0674* (2013.01)

(58) Field of Classification Search
CPC .............................. G06F 3/0631; G06F 3/0659
USPC .......................................................... 711/170
See application file for complete search history.

(56) References Cited

U.S. PATENT DOCUMENTS

| | | | |
|---|---|---|---|
| 9,134,917 B2 | 9/2015 | Kimmel et al. | |
| 9,606,734 B2 | 3/2017 | Ioannou et al. | |
| 2002/0046317 A1* | 4/2002 | Houston | G06F 3/0607 711/5 |
| 2006/0190659 A1* | 8/2006 | Biran | G06F 13/4059 710/310 |

FOREIGN PATENT DOCUMENTS

JP         5827662 B2     12/2015

OTHER PUBLICATIONS

Chandramouli et al., "Faster: A Concurrent Key-Value Store with In-Place Updates," SIGMOD'18, Jun. 10-15, 2018, 16 pages. <https://www.microsoft.com/en-us/research/uploads/prod/2018/03/faster-sigmod18.pdf>.

Mao et al., "HPDA: A Hybrid Parity-Based Disk Array for Enhanced Performance and Reliability," ACM Transactions on Storage, vol. 8, No. 1, Article 4, Feb. 2012, pp. 4:1-20. <http://or.nsfc.gov.cn/bitstream/00001903-5/90177/1/1000003549834.pdf>.

Vo et al., "LogBase: A Scalable Log-structured Database System in the Cloud," Proceedings of the VLDB Endowment, vol. 5, No. 10, Aug. 27-31, 2012, pp. 1004-1015. <http://vldb.org/pvldb/vol5/p1004_hoangtamvo_vldb2012.pdf>.

(Continued)

*Primary Examiner* — Jae U Yu
(74) *Attorney, Agent, or Firm* — Nathan M. Rau

(57) ABSTRACT

A computer-implemented method of storing data on a storage device can receive an I/O request to read data from or write data to a data storage device. The data can be stored in special sectors as allocated sectors and regular sectors as a log-structured array (LSA). If the I/O request is to read data from the storage device, a determination can be made as to whether the data to be read is stored as a special sector, which can be read from the LSA, or as a regular sector, which can be can be read from the allocated sectors. If the I/O request is to write data to the storage device, a determination can be made as to whether the data to be written is stored as a special sector, to the LSA or as a regular sector, to the allocated sectors.

20 Claims, 6 Drawing Sheets

(56) References Cited

OTHER PUBLICATIONS

Xu et al., "NOVA: A Log-structured File System for Hybrid Volatile/Non-volatile Main Memories," 14th USENIX Conference on File and Storage Technologies (FAST '16), Feb. 22-15, 2016, pp. 323-338. <https://www.usenix.org/conference/fast16/technical-sessions/presentation/xu>.

* cited by examiner

HYBRID LOG-STRUCTURED ARRAY AND ALLOCATED STORAGE DEVICE

BACKGROUND

The present disclosure generally relates to storage devices. In particular, this disclosure relates to block storage devices having a log-structured array (LSA) architecture.

Many data storage devices use an LSA structure to describe and map the logical-to-physical layout of block storage devices. Storage devices employing an LSA structure can be useful due to the trend of increasing computer memory sizes, which can result in data read operations being increasingly likely to be fulfilled from a cache memory, without need for a storage device read operation. As a result, data storage device's I/O can have an increasing proportion of write operations relative to the number of read operations. The use of an LSA can result in an increase in write throughput, as write operations can be "batched" into large sequential runs and subsequently written to the end of the current data. The technique of batched writes can be faster than locating an existing copy of the data and subsequently rewritten, with the possible addition of non-contiguous blocks. Using a batch write method, multiple, chronologically-advancing versions of both the data and associated metadata are created, meaning that earlier versions of the data and its associated metadata can also be available.

Repeated writes to the same Logical Block Address (LBA) can, however, cause the data that is written to move across locations in the storage device as new space is allocated and garbage data is collected. This can lead to problems with applications using that storage device because of constant access to sectors such as "superblock," "keep-alive" and "superblock backup" sectors. Moving these sectors to various locations on the storage device can potentially negatively impact storage device read and write performance. Further, application durability can be reduced by physically grouping sectors such as superblock, keep-alive, "superblock backup" sectors that the application would have preferred to keep separate.

SUMMARY

Embodiments can be directed towards a computer-implemented method for storing data on a data storage device. The method can include receiving an I/O request to perform a data transfer operation involving the data storage device. The data on the data storage device can include data stored in special sectors and data stored in regular sectors. The special sectors can be stored as allocated sectors and the regular sectors can be stored as a log-structured array (LSA). The method can also include determining, from content of the I/O request, a data transfer operation type and determining in response to the data transfer operation type being a read operation, a data transfer sector type. The method can also include reading, in response to the data transfer sector type being a special sector, a special sector from the LSA. The method can also include reading, in response to the data transfer sector type being a regular sector, a regular sector from the allocated sectors and determining, in response to the data transfer operation type being a write operation, a data transfer sector type. The method can also include writing, in response to the data transfer sector type being a special sector, a special sector to the LSA, and writing, in response to the data transfer sector type being a regular sector, a regular sector to the allocated sectors.

Embodiments can also be directed towards an apparatus for storing data on a data storage device. The apparatus can include an I/O processing module. The I/O processing module can be configured to receive an I/O request to perform a data transfer operation involving the data storage device, wherein the data on the data storage device comprises data stored in special sectors and data stored in regular sectors. The special sectors can be stored as allocated sectors and the regular sectors stored as an LSA. The I/O processing module can be configured to determine, from content of the I/O request, a data transfer operation type and determine in response to the data transfer operation type being a read operation, a data transfer sector type. The I/O processing module can be configured to read, in response to the data transfer sector type being a special sector, a special sector from the LSA and read, in response to the data transfer sector type being a regular sector, a regular sector from the allocated sectors. The I/O processing module can be configured to determine, in response to the data transfer operation type being a write operation, a data transfer sector type, write, in response to the data transfer sector type being a special sector, a special sector to the LSA and write, in response to the data transfer sector type being a regular sector, a regular sector to the allocated sectors.

Embodiments can also be directed towards a computer program product for storing data on a data storage device. The computer program product can include a computer-readable storage medium having program instructions embodied therewith. The program instructions can be executable by a computer to cause the computer to receive an I/O request to perform a data transfer operation involving the data storage device. The data on the data storage device can comprise data stored in special sectors and data stored in regular sectors. The special sectors can be stored as allocated sectors and the regular sectors can be stored as an LSA. The program instructions can also cause the computer to determine, from content of the I/O request, a data transfer operation type and determine in response to the data transfer operation type being a read operation, a data transfer sector type. The program instructions can also cause the computer to read, in response to the data transfer sector type being a special sector, a special sector from the LSA. The program instructions can also cause the computer to read, in response to the data transfer sector type being a regular sector, a regular sector from the allocated sectors. The program instructions can also cause the computer to determine, in response to the data transfer operation type being a write operation, a data transfer sector type. The program instructions can also cause the computer to write, in response to the data transfer sector type being a special sector, a special sector to the LSA and write, in response to the data transfer sector type being a regular sector, a regular sector to the allocated sectors.

The above summary is not intended to describe each illustrated embodiment or every implementation of the present disclosure.

BRIEF DESCRIPTION OF THE DRAWINGS

The drawings included in the present application are incorporated into, and form part of the specification. They illustrate embodiments of the present disclosure and, along with the description, serve to explain the principles of the disclosure. The drawings are only illustrative of certain embodiments and do not limit the disclosure.

Figure 1:
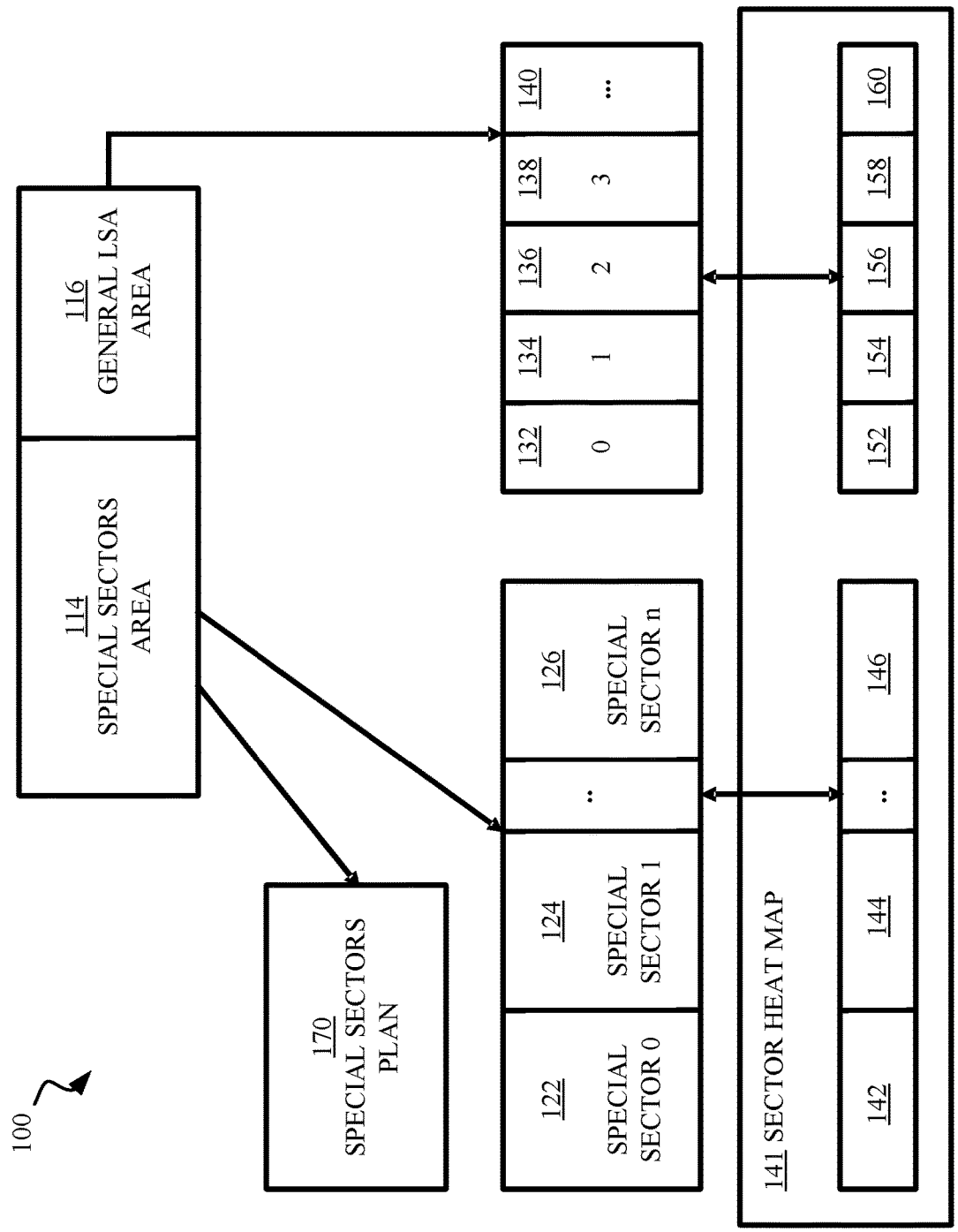
FIG. 1 is a block diagram depicting the storage of "special" sectors alongside a Log-structured array (LSA) area.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, operations, and processes.

DETAILED DESCRIPTION

Repeated writes to the same Logical Block Address (LBA), as described above, can cause the written data to move across the storage device as new space is allocated for the data and garbage data is collected. This can result in problems with a software application that uses the storage device to constantly access sector types such as "superblock," "keep-alive" and "superblock backup" sectors. Moving the above-listed sector types around on a storage device can potentially impact the storage device's read and write performance. Software application durability can also be reduced by the physical grouping of sectors that the application would have preferred to keep separate.

Embodiments of the present disclosure can be used to manage a majority of a storage device using a log-structured array (LSA), which can, as a result, benefit from its advantages. However, a small area of a storage device can be also configured to behave similar to a traditionally allocated storage device. The use of a combination of LSA alongside of traditional device allocation can greatly improve the durability and performance of running software applications. If a piece of data is always written to the same location in a storage device, then in the event of a failure where a newer version of the piece of data is lost, e.g., a version stored in a cache layer, then an older version of the data will be available from the location in the storage device. If a piece of data is always written to a different location in the data storage device, then no older version of the data would be available for recovery. Software application performance can also be improved as a result of having some data always written at the same location in the storage device, which means there is less I/O amplification. For example, there is no need to read another storage device to perform a lookup and subsequently read another address, or to read a large portion of the data to simultaneously receive both the metadata describing where the data is written and the data itself.

FIG. 1 is a block diagram 100 depicting the storage of "special" sectors alongside the LSA area of a storage device. General LSA storage area 116 is a conventional LSA used in a storage device for writing portions of data to entries 132-140 in a log. Special sectors area 114 can be used for allocating space to special sectors 122-126, such as, for example, superblock, keep-alive sectors or superblock backup sectors. These sectors are provided as examples, and any number, including none, any or all of these sectors can be defined as special sectors. Other sectors may be defined instead, or in addition, as special sectors.

Superblock sectors can include filing system metadata and can define, for example, the filing system type, size, status, and other information about other metadata structures. Superblock sectors can include metadata of metadata. A superblock can be a very critical portion of a filing system and is typically stored as multiple redundant copies for each filing system. Improved filing system performance can be obtained if the locations of the superblock and any superblock backup sectors are substantially constant and not part of the LSA used in the filing system. Keep-alive sectors can be sectors of a storage device that hosts are constantly writing to and reading from in order to check that the host can access the storage device. These sectors are generally stored as special sectors. Embodiments of the invention include superblocks that include any metadata of metadata and are not limited to the examples given above.

Special sectors plan 170 includes a data structure that identifies which sectors of a storage device are regular sectors 132-140 and which of the sectors are special sectors 122-126. In some embodiments, only those sectors identified as special sectors 122-126 are identified. Sectors other than those identified as special sectors 122-126 are presumed to be regular sectors 132-140. Sector heat map 141, used in embodiments of the invention, includes items of metadata 142-160 which are associated with respective data areas 122-140. Sector heat map 141 is described later in more detail with reference to FIG. 3. Each item of metadata 142-160 contains information related to the "heat" of a sector, i.e., how often the sector has been written to. This information can include an indicator of how frequently each of the regular sectors 132-140 and how frequently each of the special sectors 122-126 have been written to. The indicator can be associated with each of the regular sectors 132-140 and with each of the special sectors 122-126.

Figure 2:
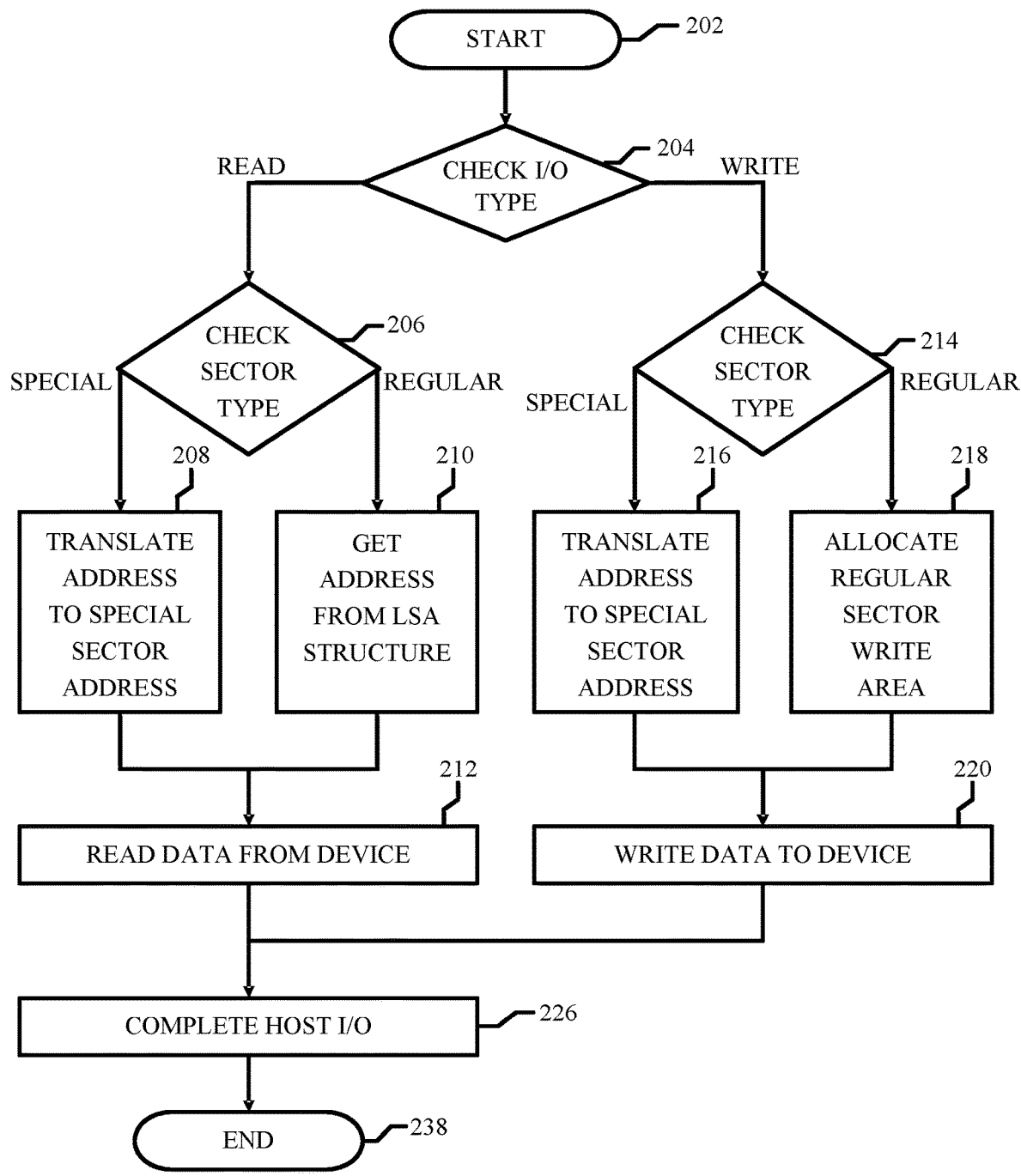
FIG. 2 is a flow diagram depicting a computer-implemented method for storing data on a storage device based upon "special" sector or LSA origin/destination.

FIG. 2 is a flow diagram depicting a computer-implemented method for storing data on a data storage device. FIG. 2 depicts how various types of host I/O data transfer operations can be treated differently, depending on whether they involve a "special" sector 122-126, FIG. 1, or involve the LSA area 116, FIG. 1. Embodiments of the invention start at operation 202. An I/O request to perform a data transfer operation, i.e., read data from or write data to a storage device, is received. The data on the storage device can include both data stored in special sectors 122-126, FIG. 1, and data stored in regular sectors 132-140, FIG. 1. Data stored in the special sectors 122-126, FIG. 1, is stored as allocated sectors and data stored in the regular sectors 132-140, FIG. 1, is stored as an LSA. At operation 204, a determination is made, based upon the content of the I/O request, regarding a data transfer operation type, i.e., what type of host I/O is to be processed. According to embodiments, the data transfer operation type can be a read operation, involving reading data from the data storage device or a write operation, involving writing data to the data storage device.

In response to the I/O request being to read data from the storage device, i.e., if the data transfer operation type, determined at operation 204, to be processed is a read operation, then processing moves to operation 206. At operation 206, a data transfer sector type is determined. If the data transfer sector type is a special sector, then the data to be read is stored as a special sector 122-126, FIG. 1. Similarly, if the data transfer sector type is a regular sector, then the data to be read is stored as a regular sector 132-140, FIG. 1. Special sectors, e.g., 122-126, FIG. 1, can be used for those sectors to which constant access can be required, and regular sectors, e.g., 132-140, FIG. 1, can be used for the storage of data such as, for example, normal file data.

In response to the data to be read being stored as a special sector 122-126, FIG. 1, then at operation 208, the address to be read is translated to a special sector address. In response to the data being stored as a regular sector 132-140, FIG. 1, then, at operation 210, the address to be read is obtained from the LSA structure 116, FIG. 1. At operation 212, the address that was translated at operation 208 is used to read the special sector 122-126, FIG. 1, from the LSA on the storage device or the address that was obtained at operation 210 is used to read the regular sector 132-140, FIG. 1, from the allocated sectors.

In response to the I/O request being to write data to the storage device, i.e., if the data transfer operation type, determined at operation 204, to be processed is a write operation, then processing moves to operation 214. At operation 214, a data transfer sector type is determined. If the data transfer sector type is a special sector, then the data to be written is stored as a special sector, e.g., 122-126, FIG. 1. Similarly, if the data transfer sector type is a regular sector, then the data to be written is stored as a regular sector 132-140, FIG. 1. Special sectors, e.g., 122-126, FIG. 1, can be used for those sectors to which constant access can be required, and regular sectors, e.g., 132-140, FIG. 1, can be used for the storage of data such as, for example, normal file data.

In response to the data to be written being stored as a special sector 122-126, FIG. 1, then, at operation 216, the address to be written is translated to a special sector address. In response to the data being stored as a regular sector 132-140, FIG. 1, then, at operation 218, a regular sector write area is allocated in the LSA structure 116, FIG. 1. At operation 220, the address that was translated at operation 216 is used to write the special sectors, e.g., 122-126, FIG. 1, to the LSA data on the storage device or the regular sectors e.g., 132-140, FIG. 1, are written to the regular sector write area on the storage device that was allocated at operation 218. At operation 226, the host I/O is completed. The method ends at operation 238.

Figure 3A:
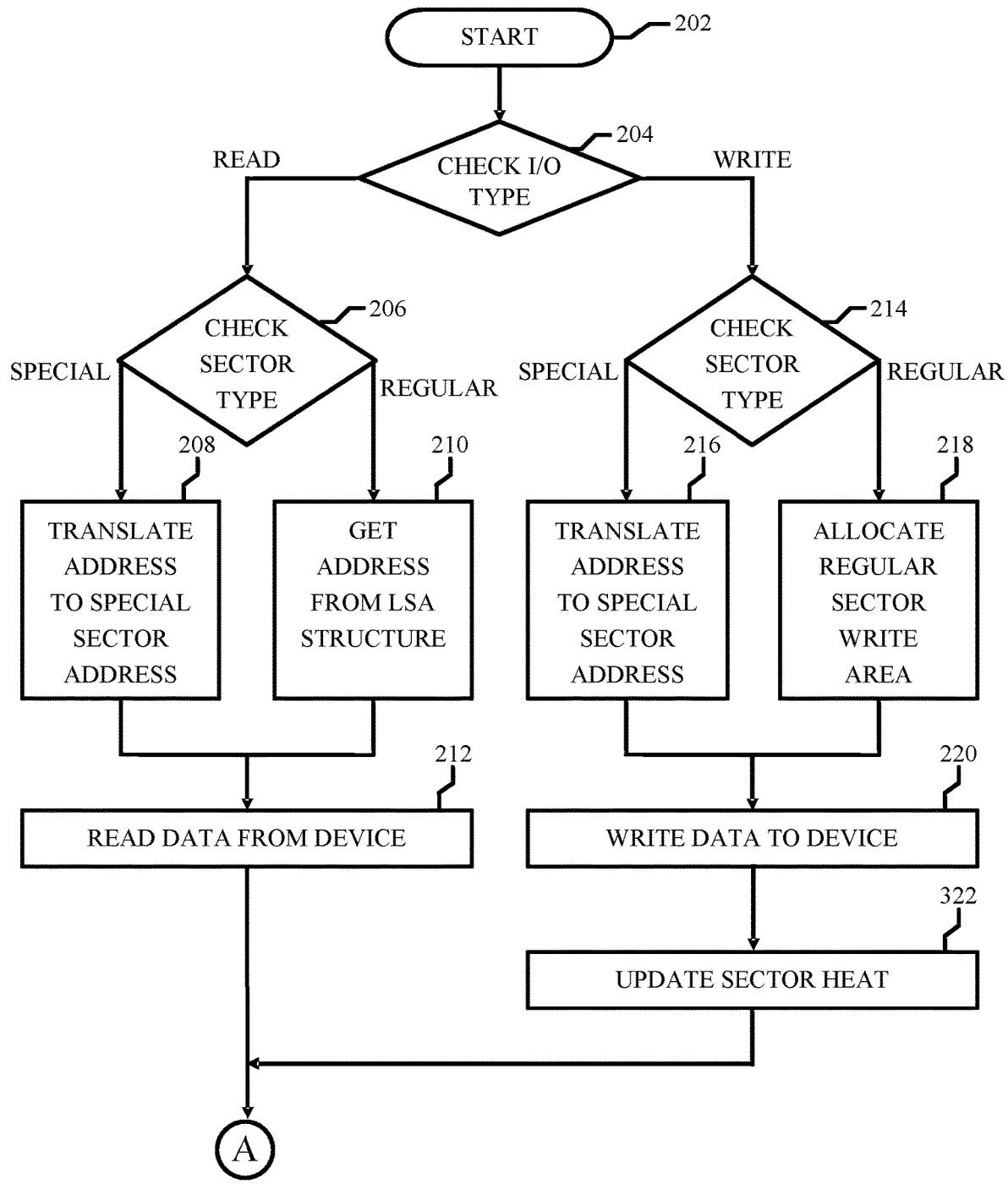
FIGS. 3A and 3B comprise a flow diagram depicting a variation of the method of FIG. 2 in which the system dynamically determines which sectors should be "special."
Figure 3B:
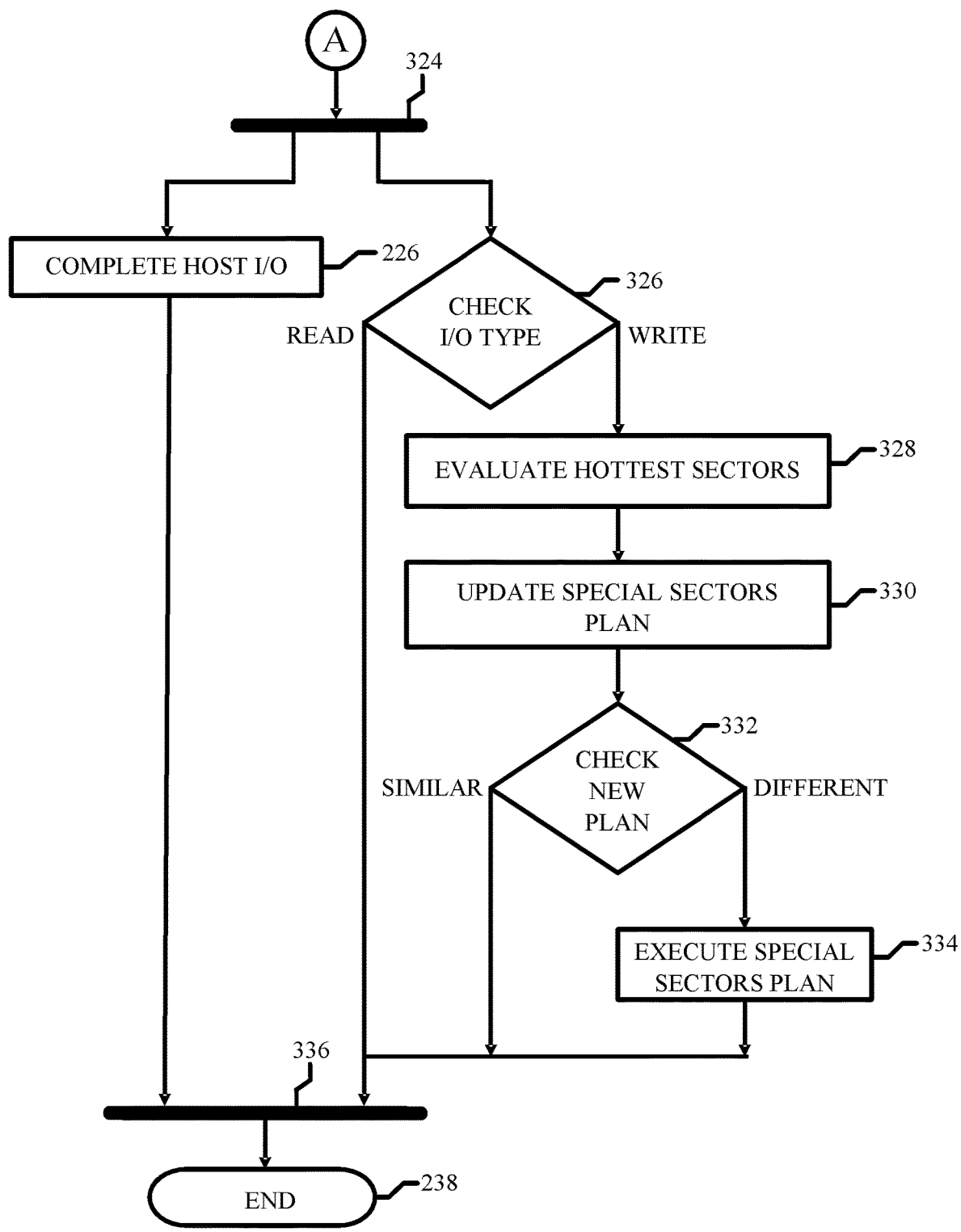

FIGS. 3A and 3B comprise a flow diagram, generally consistent with the flow diagram depicted in FIG. 2, that depicts a computer-implemented method in which the application dynamically determines which sectors are "special," rather than the "special" sectors being predetermined, e.g., specified within the I/O request. In some embodiments, this example computer-implemented method can be deployed more easily than the method depicted in FIG. 2, and can remove the need to know, in advance, which sectors are most important for a host device or filing system.

This method starts at operation 202 and proceeds, if the data transfer operation type is a read operation, through operations 204 to 212 and then through connector "A" to FIG. 3B. Similarly, the method proceeds, if the data transfer operation type is a write operation, through operations 204 to 220. Operations 202 to 220 are generally consistent with operations described above with reference to FIG. 2, and will not be described again. If the data transfer operation type is determined to be a write operation, then following operation 220, the method proceeds to operation 322. At operation 322, the sector "heat," i.e., how frequently a sector has been written to, is recorded/updated and the method proceeds to FIG. 3B through connector "A". The sector "heat" was previously described above with reference to items 141-160, FIG. 1.

When processing has proceeded through connector "A", at operation 324, the method splits into two concurrent activities. In the first of those concurrent activities, at operation 226, the host I/O is completed. At operation 336, the method waits, in order to combine the first and second of those two concurrent activities.

In the second of those concurrent activities, at operation 326, a determination is made, based upon the content of the I/O request, regarding a data transfer operation type, i.e., what type of host I/O is to be processed. If the data transfer operation type to be processed is a read operation, then the method proceeds to operation 336. At operation 336, the first and second of those two concurrent activities from operation 226 and operation 326 are combined and the method ends at operation 238. In response to the data transfer operation type, determined at operation 326, to be processed being a write operation, then the method moves to operation 328. At operation 328, the "hottest" sectors are evaluated. This evaluation can use the sector heat map 141, FIG. 1, to identify which sectors have been written to most frequently and are therefore the "hottest" sectors. At operation 330, the special sectors plan 170, FIG. 1, is updated by evaluating indicators to identify one or more most-frequently written-to sectors and updating one or more of the one or more most-frequently written-to sectors to be special sectors 122-126, FIG. 1. In some embodiments, sectors which were previously most-frequently written-to sectors may now not be most-frequently written-to sectors and thus can be updated to be regular sectors 132-140, FIG. 1.

At operation 332, a check is made as to whether the updated special sectors plan 170, FIG. 1, is unchanged from the previous special sectors plan 170, FIG. 1, or whether it has changed. If the updated special sectors plan 170, FIG. 1, is unchanged from the previous special sectors plan 170, FIG. 1, then the method proceeds to operation 336. At operation 336, the first and second of those two concurrent activities from operation 226 and operation 326 are combined and the method ends at operation 238. If the updated special sectors plan 170, FIG. 1, has changed from the previous special sectors plan 170, FIG. 1, then the method proceeds to operation 334. At operation 334, the updated special sectors plan 170, FIG. 1, is executed. Processing continues to operation 336, where the first and second of those two concurrent activities from operation 226 and operation 334 are combined and the method ends at operation 238.

In some embodiments, a plurality of generations of these "special" sectors 122-126, FIG. 1, can be stored, cycling between them using, for example, a double or multi-buffering approach. In some embodiments, the probability of surviving a filing system failure or storage device failure while having an in-flight write to one of these areas can be further improved through the use of a plurality of generations of "special" sectors 122-126, FIG. 1.

Figure 4:
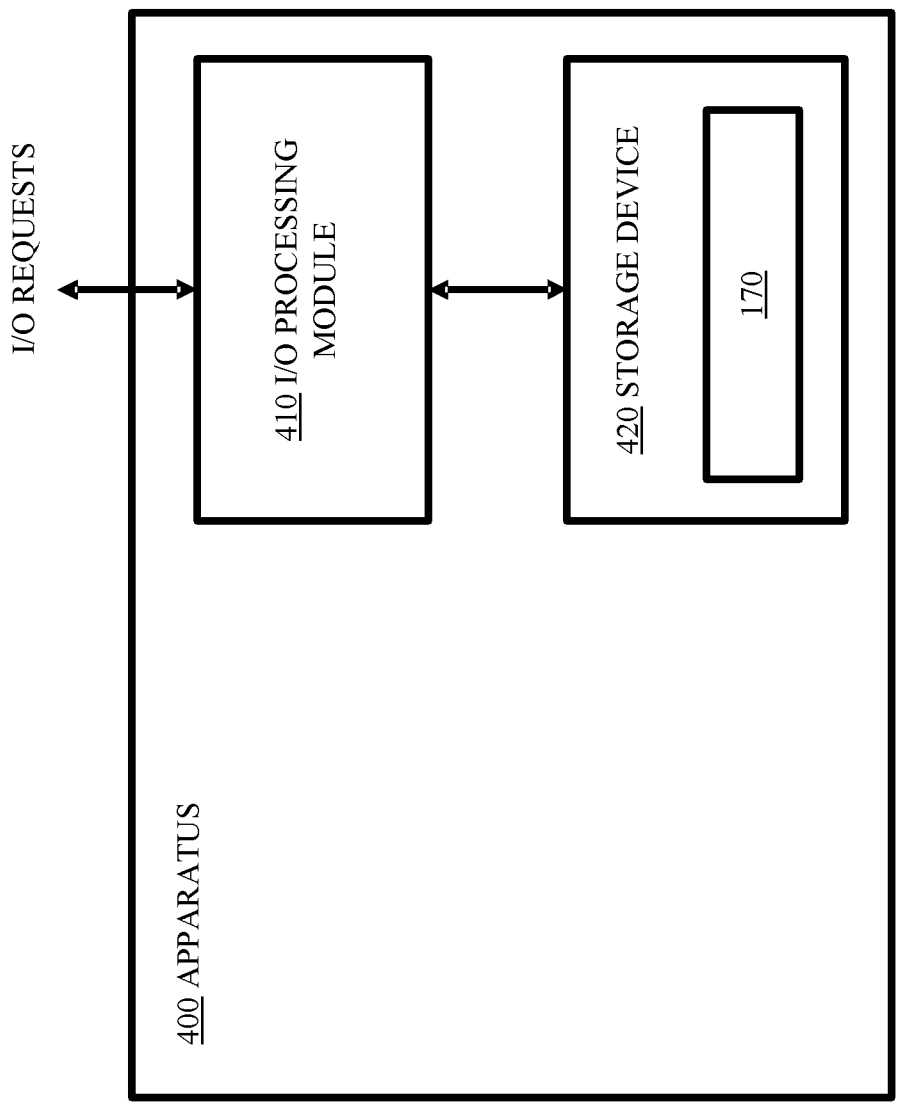
FIG. 4 is a block diagram depicting an apparatus in which embodiments of the present disclosure can be implemented.

FIG. 4 is a block diagram of apparatus in which embodiments of the present disclosure can be implemented. Apparatus 400 receives I/O requests from one or more hosts (not shown). I/O processing module can perform the exemplary computer-implemented method of FIG. 2 or of FIG. 3 on the received I/O requests. Storage device 420 and special sectors plan 170 can be updated as appropriate.

Figure 5:
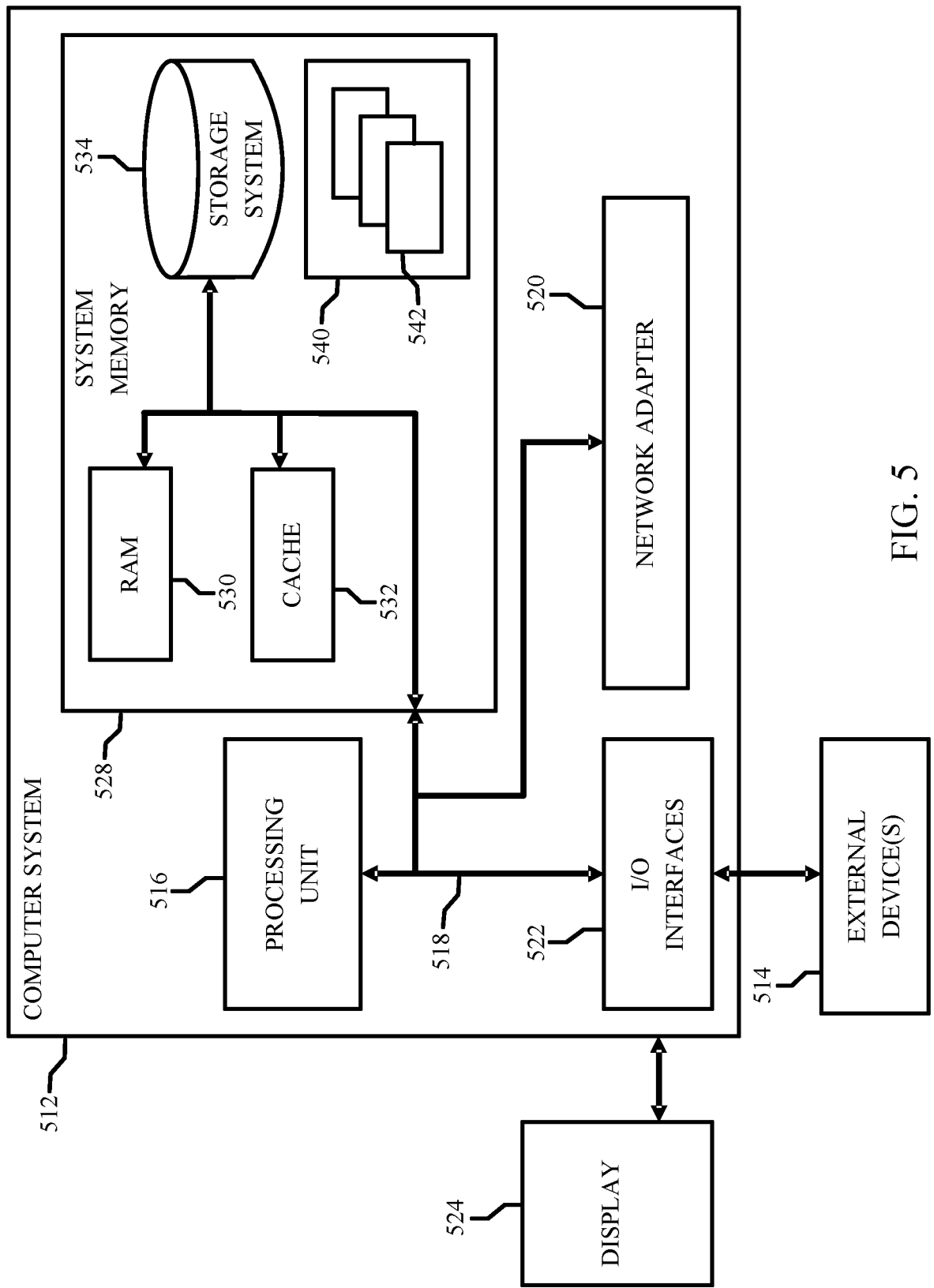
FIG. 5 is a block diagram depicting a computer system in which embodiments of the present disclosure can be implemented.

FIG. 5 depicts a schematic of an example computing system. Computing system 512 is only one example of a suitable computing system and is not intended to suggest any limitation as to the scope of use or functionality of embodiments of the invention described herein. Regardless, computing system 512 is capable of being implemented and/or performing any of the functionality set forth hereinabove.

Computer system/server 512 is operational with numerous other general purpose or special purpose computing system environments or configurations. Examples of well-known computing systems, environments, and/or configurations that can be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 512 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 5, computer system/server 512 is depicted in the form of a general-purpose computing device. The components of computer system/server 512 can include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532.

Computer system/server 512 may further include other removable/non-removable, volatile/non-volatile computer system storage media. By way of example only, storage system 534 can be provided for reading from and writing to a non-removable, non-volatile magnetic media, not shown and typically called a "hard drive". Although not shown, a magnetic disk drive for reading from and writing to a removable, non-volatile magnetic disk, e.g., a "floppy disk", and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set, e.g., at least one, of program modules that are configured to carry out the functions of embodiments of the invention.

Program/utility 540, having a set i.e., at least one, of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices, e.g., network card, modem, etc., that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network, e.g., the Internet, via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media, e.g., light pulses passing through a fiber-optic cable, or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example, through the Internet using an Internet Service Provider. In some embodiments, electronic circuitry including, for example, programmable logic circuitry, column-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flow diagram illustrations and/or block diagrams of methods, apparatus/systems, and computer program products according to embodiments of the invention. It will be understood that each block of the flow diagram illustrations and/or block diagrams, and combinations of blocks in the flow diagram illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flow diagram and/or block diagram block or blocks.

The computer-readable program instructions may also be loaded onto a computer, other programmable data processing apparatus, or other device to cause a series of operations to be performed on the computer, other programmable apparatus or other device to produce a computer-implemented process, such that the instructions which execute on the computer, other programmable apparatus, or other device implement the functions/acts specified in the flow diagram and/or block diagram block or blocks.

The flow diagram and block diagrams in the Figures illustrate the architecture, functionality, and operation of possible implementations of systems, methods, and computer program products according to various embodiments of the present disclosure. In this regard, each block in the flow diagram or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for storing data on a data storage device, the method comprising:

receiving an I/O request to perform a data transfer operation involving the data storage device, wherein the data on the data storage device comprises data stored in special sectors and data stored in regular sectors, the special sectors stored as allocated sectors and the regular sectors stored as a log-structured array (LSA);

determining, from content of the I/O request, a data transfer operation type;

determining in response to the data transfer operation type being a read operation, a data transfer sector type;

reading, in response to the data transfer sector type being a special sector, a special sector from the LSA; and reading, in response to the data transfer sector type being a regular sector, a regular sector from the allocated sectors; and determining, in response to the data transfer operation type being a write operation, a data transfer sector type;

writing, in response to the data transfer sector type being a special sector, a special sector to the LSA; and writing, in response to the data transfer sector type being a regular sector, a regular sector to the allocated sectors.

2. The computer-implemented method of claim 1, further comprising, translating, in response to the data transfer sector type being a special sector, an address associated with the data to a special sector address.

3. The computer-implemented method of claim 1, further comprising, in response to the data transfer sector type being a regular sector:
  in response to the I/O request being a read operation, obtaining an address associated with the data to be read from the LSA; and
  in response to the I/O request being a write operation, allocating a regular sector write area within the LSA.

4. The computer-implemented method of claim 1, wherein:
  a special sectors plan including indicators associated with each sector that indicate which sectors are special sectors and that further indicate how often each of the special sectors has been written to; and
  wherein the computer-implemented method further comprises:
    updating, in response to the data transfer operation type being a write operation, indicators associated with each of the special sectors; and
    evaluating the indicators to identify at least one most-frequently written-to sector and updating one of the at least one most-frequently written-to sectors to be special sectors.

5. The computer-implemented method of claim 4, wherein:
  the special sectors plan further includes indicators associated with each sector that indicate which sectors are regular sectors and that further indicate how often each of the regular sectors has been written to;
  wherein the computer-implemented method further comprises;
    updating indicators associated with each of the regular sectors; and
    evaluating the indicators to identify at least one most-frequently written-to sector and updating one of the at least one most-frequently written-to regular sectors to be special sectors.

6. The computer-implemented method of claim 1, wherein a plurality of generations of special sectors is stored on the storage device.

7. The computer-implemented method of claim 1, wherein the determining of a data transfer sector type is based upon content of the I/O request.

8. An apparatus for storing data on a data storage device, the apparatus comprising:
  an I/O processing module configured to:
    receive an I/O request to perform a data transfer operation involving the data storage device, wherein the data on the data storage device comprises data stored in special sectors and data stored in regular sectors, the special sectors stored as allocated sectors and the regular sectors stored as a log-structured array (LSA);
    determine, from content of the I/O request, a data transfer operation type;
    determine in response to the data transfer operation type being a read operation, a data transfer sector type;
    read, in response to the data transfer sector type being a special sector, a special sector from the LSA; and
    read, in response to the data transfer sector type being a regular sector, a regular sector from the allocated sectors; and
    determine, in response to the data transfer operation type being a write operation, a data transfer sector type;
    write, in response to the data transfer sector type being a special sector, a special sector to the LSA; and
    write, in response to the data transfer sector type being a regular sector, a regular sector to the allocated sectors.

9. The apparatus of claim 8, wherein the I/O processing module is further configured to, in response to the data transfer sector type being a special sector, translate an address associated with the data to a special sector address.

10. The apparatus of claim 8, wherein the I/O processing module is further configured to, in response to the data transfer sector type being a regular sector:
  obtain, in response to the data transfer operation type being a read operation, an address associated with the data to be read from the LSA; and
  allocate, in response to the data transfer operation type being a write operation, a regular sector write area within the LSA.

11. The apparatus of claim 8, wherein the I/O processing module includes:
  a special sectors plan including indicators associated with each sector that indicate which sectors are special sectors and which sectors are regular sectors and that further indicate how often each of the special and the regular sectors has been written to;
  wherein the I/O processing module is further configured to:
    update, in response to the data transfer operation type being a write operation, indicators associated with each of the special sectors and with each of the regular sectors; and
    evaluate the indicators to identify at least one most-frequently written-to sector and updating at least one of the at least one most-frequently written-to sectors to be special sectors.

12. The apparatus of claim 11, wherein:
  the special sectors plan further includes indicators associated with each regular sector that indicate how often each regular sector has been written to;
  wherein the I/O processing module is further configured to:
    update indicators associated with each of the regular sectors; and
    evaluate the indicators to identify at least one most-frequently written-to sector and update the at least one most-frequently written-to sector from a regular sector to a special sector.

13. The apparatus of claim 8, wherein a plurality of generations of special sectors is stored on the storage device.

14. The apparatus of claim 8, wherein the I/O processing module is further configured to determine a data transfer sector type based upon content of the I/O request.

15. A computer program product for storing data on a data storage device, the computer program product comprising:

a computer-readable storage medium having program instructions embodied therewith, the program instructions executable by a computer to cause the computer to:
- receive an I/O request to perform a data transfer operation involving the data storage device;
- determine when a data transfer operation type in the I/O request is a read operation, a data transfer sector type;
  - read, when the data transfer sector type is a special sector, a special sector from a log-structured array (LSA); and
  - read, when the data transfer sector type is a regular sector, a regular sector from allocated sectors; and
- determine, when the data transfer operation type in the I/O request is a write operation, a data transfer sector type;
  - write, when the data transfer sector type is a special sector, a special sector to the LSA; and
  - write, when the data transfer sector type is a regular sector, a regular sector to the allocated sectors.

16. The computer program product of claim 15, the program instructions further executable by the computer to cause the computer to, when the data transfer sector type is a special sector, translate an address associated with the data to a special sector address.

17. The computer program product of claim 15, the program instructions further executable by the computer to cause the computer to, when the data transfer sector type is a regular sector:
- obtain, when the data transfer operation type is a read operation, an address associated with the data to be read from the LSA; and
- allocate, when the data transfer operation type is a write operation, a regular sector write area within the LSA.

18. The computer program product of claim 15, wherein:
- a special sectors plan is associated with each of the regular sectors and with each of the special sectors, the special sectors plan includes indicators, associated with each sector, that indicate which sectors are special sectors and that indicate which sectors are regular sectors and that further indicate how frequently each of the special and the regular sectors has been written to; and
- the program instructions are further executable by the computer to cause the computer to, when the data transfer operation type is a write operation:
  - update indicators associated with each of the special sectors and with each of the regular sectors; and
  - evaluate indicators to identify at least one most-frequently written-to sector and to update one most-frequently written-to sector to be a special sector.

19. The computer program product of claim 18, wherein:
- the special sectors plan further includes indicators that indicate which sectors are regular sectors and indicators that indicate how frequently each of the regular sectors has been written to;
- the program instructions are further executable by the computer to cause the computer to:
  - update indicators associated with each of the regular sectors; and
  - evaluate indicators to identify at least one most-frequently written-to sector and update one most-frequently written-to sector from the regular sectors to be a special sector.

20. The computer program product of claim 15, wherein a plurality of generations of special sectors is stored on the storage device.

* * * * *